United States Patent
Tagawa

(10) Patent No.: US 10,005,444 B2
(45) Date of Patent: Jun. 26, 2018

(54) VEHICLE

(71) Applicant: TOYOTA JIDOSHA KABUSHIKI KAISHA, Toyota-shi, Aichi-ken (JP)

(72) Inventor: Yohsuke Tagawa, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days. days.

(21) Appl. No.: 14/881,287

(22) Filed: Oct. 13, 2015

(65) Prior Publication Data
US 2016/0107519 A1 Apr. 21, 2016

(30) Foreign Application Priority Data
Oct. 15, 2014 (JP) .................. 2014-211004

(51) Int. Cl.
| | |
|---|---|
| *B60W 10/06* | (2006.01) |
| *B60W 20/40* | (2016.01) |
| *F16H 63/46* | (2006.01) |
| *F16H 63/50* | (2006.01) |
| *B60K 6/365* | (2007.10) |
| *B60K 6/445* | (2007.10) |
| *B60W 10/08* | (2006.01) |

(52) U.S. Cl.
CPC .......... *B60W 10/06* (2013.01); *B60K 6/365* (2013.01); *B60K 6/445* (2013.01); *B60W 10/08* (2013.01); *B60W 20/40* (2013.01); *F16H 63/46* (2013.01); *F16H 63/50* (2013.01); *B60Y 2200/92* (2013.01); *B60Y 2300/188* (2013.01); *B60Y 2300/18175* (2013.01); *Y02T 10/6239* (2013.01); *Y02T 10/6286* (2013.01); *Y10S 903/93* (2013.01)

(58) Field of Classification Search
None
See application file for complete search history.

(56) References Cited

U.S. PATENT DOCUMENTS

| | | | | |
|---|---|---|---|---|
| 6,059,064 A * | 5/2000 | Nagano | ..................... | B60K 6/44 180/243 |
| 6,459,980 B1 * | 10/2002 | Tabata | ..................... | B60K 6/46 180/65.1 |
| 7,018,321 B2 * | 3/2006 | Claar | ................... | B60K 28/165 477/92 |
| 7,058,498 B2 * | 6/2006 | Kano | ................... | B60K 28/165 477/39 |

(Continued)

FOREIGN PATENT DOCUMENTS

| | | |
|---|---|---|
| JP | 2006-44536 | 2/2006 |
| JP | 2009-012618 A | 1/2009 |

(Continued)

*Primary Examiner* — Katy M Ebner
(74) *Attorney, Agent, or Firm* — Finnegan, Henderson, Farabow, Garrett & Dunner, LLP

(57) ABSTRACT

An HV-ECU executes a control process including the step of executing reverse rotation prevention control for an engine when EV running is in execution in a vehicle (YES in S100), an ABS is usable (YES in S102) and a magnitude of an amount of change in rotation speed of a ring gear of a differential unit is larger than a threshold value A (YES in S104), or when the ABS is unusable (NO in S102) and a magnitude of an amount of reduction in rotation speed of the ring gear of the differential unit is larger than a threshold value B (YES in S106).

3 Claims, 8 Drawing Sheets

(56) References Cited

U.S. PATENT DOCUMENTS

| | | | |
|---|---|---|---|
| 7,074,160 B1 * | 7/2006 | Inoue | B60K 28/165 477/180 |
| 7,197,383 B2 * | 3/2007 | Tobler | B60K 6/48 701/22 |
| 7,601,093 B2 * | 10/2009 | Tabata | B60K 6/365 180/65.285 |
| 7,650,956 B2 * | 1/2010 | Hirata | B60K 6/445 180/248 |
| 8,634,978 B2 * | 1/2014 | Matsubara | B60K 6/445 180/65.235 |
| 9,145,127 B2 * | 9/2015 | Uematsu | B60T 8/175 |
| 2005/0182533 A1 | 8/2005 | Tobler et al. | |
| 2013/0166121 A1 * | 6/2013 | Takeuchi | B60K 6/445 701/22 |

FOREIGN PATENT DOCUMENTS

| | | |
|---|---|---|
| JP | 2009-280177 A | 12/2009 |
| JP | 2014-058197 A | 4/2014 |

* cited by examiner

|  | C1 | C2 | C3 | B1 | B2 | F1 |
|---|---|---|---|---|---|---|
| 1st | ○ |  |  |  | (○) | △ |
| 2nd | ○ |  |  | ○ |  |  |
| 3rd | ○ | ○ |  |  |  |  |
| 4th |  | ○ |  | ○ |  |  |
| R |  |  | ○ |  | ○ |  |
| N |  |  |  |  |  |  |

○ :ENGAGEMENT
(○):ENGAGEMENT AT THE TIME OF ENGINE BRAKING
△ :ENGAGEMENT ONLY AT THE TIME OF DRIVING

VEHICLE

This nonprovisional application is based on Japanese Patent Application No. 2014-211004 filed on Oct. 15, 2014 with the Japan Patent Office, the entire contents of which are hereby incorporated by reference.

BACKGROUND OF THE INVENTION

Field of the Invention

The present invention relates to control of a hybrid vehicle having an internal combustion engine and a drive wheel coupled by a planetary gear mechanism.

Description of the Background Art

Japanese Patent Laying-Open No. 2006-044536 discloses the technique of when a slip (idling) occurs at a drive wheel during motor running, restricting the torque from a motor and thereby suppressing the slip in a hybrid vehicle having an internal combustion engine and a motor coupled to a plurality of rotation elements of a planetary gear mechanism. In this hybrid vehicle, the internal combustion engine is coupled to a carrier of the planetary gear mechanism, a generator is coupled to a sun gear of the planetary gear mechanism, and the motor is coupled to a ring gear of the planetary gear mechanism.

SUMMARY OF THE INVENTION

Instead of restricting the torque from the motor, it is also conceivable, for example, to actuate a brake and reduce the rotation speed of the drive wheel in order to immediately suppress the slip when the slip occurs at the drive wheel during the motor running in which the vehicle runs by using the motor, with the internal combustion engine stopped. However, in the case where the internal combustion engine and the motor are coupled by the planetary gear mechanism, a rotation shaft of the internal combustion engine that was in the stop state may rotate in a direction opposite to a direction at the time of actuation due to the inertial force and the like acting on the other rotation elements, when the rotation speed of the drive wheel is reduced by the brake.

An object of the present invention is to provide a vehicle that suppresses the rotation of the rotation shaft of the internal combustion engine in the direction opposite to the direction at the time of actuation during the motor running.

A vehicle according to an aspect of the present invention is a vehicle including: a planetary gear mechanism having a sun gear, a ring gear and a carrier; an internal combustion engine coupled to the carrier and configured to rotate in a predetermined direction at the time of actuation; a drive wheel coupled to one rotation element which is one of the sun gear and the ring gear; and a rotating electric machine provided on a motive power transfer path between the one rotation element and the drive wheel. When the vehicle is running by using the rotating electric machine, with the internal combustion engine stopped, and a magnitude of an amount of change in rotation speed of the one rotation element is larger than a threshold value, the vehicle is controlled to actuate the internal combustion engine.

With such a configuration, by actuating the internal combustion engine, the rotation speed of the internal combustion engine can be increased. Therefore, even if the force in the reverse rotation direction acts on the internal combustion engine, it is possible to suppress the rotation of the rotation shaft of the internal combustion engine in the direction opposite to the direction at the time of actuation.

A vehicle according to another aspect of the present invention is a vehicle including: a planetary gear mechanism having a sun gear, a ring gear and a carrier; an internal combustion engine coupled to the carrier and configured to rotate in a predetermined direction at the time of actuation; a drive wheel coupled to one rotation element which is one of the sun gear and the ring gear; a rotating electric machine provided on a motive power transfer path between the one rotation element and the drive wheel; and a clutch for switching a state between the internal combustion engine and the drive wheel from one of a motive power transfer state and a motive power interruption state to the other. When the vehicle is running by using the rotating electric machine, with the internal combustion engine stopped, and a magnitude of an amount of change in rotation speed of the one rotation element is larger than a threshold value, the clutch is controlled to bring about the motive power interruption state.

With such a configuration, by controlling the clutch to bring about the motive power interruption state, the force in the reverse rotation direction acting on the internal combustion engine can be suppressed. Therefore, it is possible to suppress the rotation of the rotation shaft of the internal combustion engine in the direction opposite to the direction at the time of actuation.

Preferably, the threshold value is set to be larger when braking with an antilock brake system is possible than when braking with the antilock brake system is impossible.

With such a configuration, an appropriate threshold value can be set depending on whether or not braking with the antilock brake system is performed, and thus, unnecessary startup of the internal combustion engine can be suppressed.

More preferably, the vehicle thither includes a transmission provided between the one rotation element and the drive wheel, and configured to change a speed ratio. The threshold value is set to be larger when the speed ratio is a high speed side speed ratio than when the speed ratio is a low speed side speed ratio.

With such a configuration, an appropriate threshold value can be set depending on a shift stage, and thus, unnecessary startup of the internal combustion engine can be suppressed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
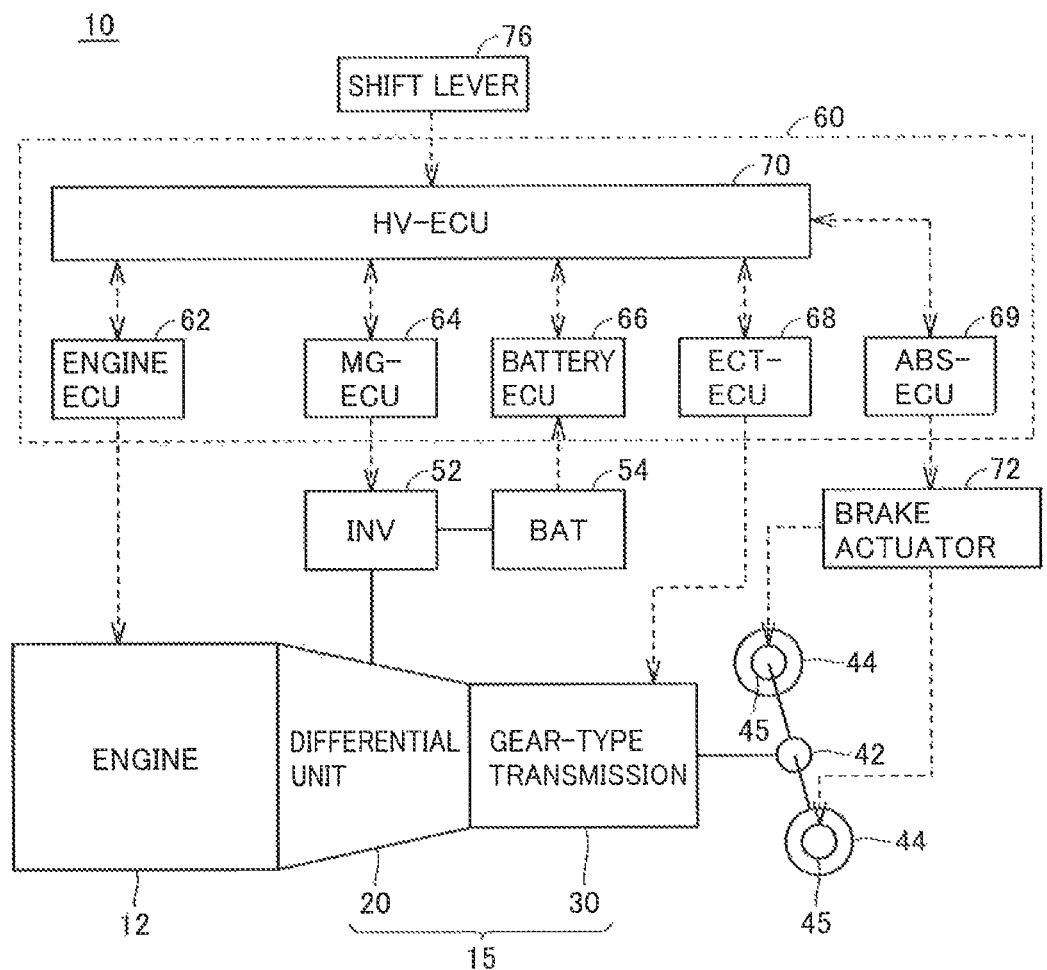
FIG. 1 is a schematic configuration diagram of a motive power transfer system of a vehicle and a control system thereof.

An embodiment of the present invention will be described hereinafter with reference to the drawings. In the following description, the same components are denoted by the same reference characters. Their names and functions are also the same. Therefore, detailed description of them will not be repeated.

As shown in FIG. 1, a vehicle 10 includes an engine 12, a speed change unit 15, a differential gear mechanism 42, and a drive wheel 44. Speed change unit 15 includes a differential unit 20 and a transmission 30. Vehicle 10 further includes an inverter 52, a power storage device 54, a control device 60, a brake actuator 72, and a shift lever 76.

Engine 12 is an internal combustion engine that generates motive power by converting thermal energy produced by combustion of a fuel into kinetic energy for moving elements such as a piston and a rotor. Differential unit 20 is coupled to engine 12. Differential unit 20 includes a motor generator driven by inverter 52 and a power split device for dividing an output of engine 12 into the motor generator and a member for transfer to transmission 30. Differential unit 20 is configured to be capable of controlling an operating point of the motor generator as appropriate and thereby continuously changing a ratio (speed ratio) between the rotation speed of an output shaft of engine 12 and the rotation speed of the transfer member connected to transmission 30. Differential unit 20 functions as a continuously variable transmission. A detailed configuration of differential unit 20 will be described below.

Transmission 30 is coupled to differential unit 20 and is configured to be capable of changing a ratio (speed ratio) between the rotation speed of a transfer member (an input shaft of transmission 30) connected to differential unit 20 and the rotation speed of a drive shaft (an output shaft of transmission 30) connected to differential gear mechanism 42. Transmission 30 may be a gear-type automatic transmission that can change a speed ratio in a stepwise manner by engaging or disengaging a plurality of hydraulically-actuated friction engagement elements (a clutch and a brake) in a prescribed combination, or may be a continuously variable automatic transmission that can change a speed ratio continuously, or may be a manual transmission that can select a shift stage in conjunction with the operation of a shift lever by a driver.

Based on the speed ratio of transmission 30 and the speed ratio of differential unit 20, a speed ratio of speed change unit 15 (a total speed ratio between the output shaft of engine 12 and the drive shaft) is determined. A detailed configuration of transmission 30 will also be described below, together with differential unit 20. Differential gear mechanism 42 is coupled to the output shaft of transmission 30 and transmits the motive power output from transmission 30 to drive wheel 44.

Inverter 52 is controlled by control device 60 and controls driving of the motor generator included in differential unit 20. Inverter 52 is configured by, for example, a bridge circuit including power semiconductor switching elements of three phases. Although not shown, a voltage converter may be provided between inverter 52 and power storage device 54.

Power storage device 54 is a rechargeable DC power supply and is typically configured by a secondary battery such as a lithium ion battery or a nickel-metal hydride battery. Instead of the secondary battery, power storage device 54 may be configured by a power storage element such as an electric double layer capacitor.

Control device 60 includes an engine ECU (Electronic Control Unit) 62, an MG-ECU 64, a battery ECU 66, an ECT-ECU 68, an ABS-ECU 69, and an HV-ECU 70. Each of these ECUs includes a CPU (Central Processing Unit), a storage device, an input/output buffer and the like (all are not shown), and executes prescribed control. The control executed by each ECU is not limited to a software process, but may be processed by dedicated hardware (electronic circuitry).

Based on an engine torque command and the like received from HV-ECU 70, engine ECU 62 generates a control signal for driving engine 12 and outputs the generated control signal to engine 12. Based on a torque command and the like for the motor generator included in differential unit 20, which is received from HV-ECU 70, MG-ECU 64 generates a control signal for driving inverter 52 and outputs the generated control signal to inverter 52.

Based on a voltage and/or a current of power storage device 54, battery ECU 66 estimates a state of charge of power storage device 54 (indicated by an SOC value that expresses an amount of current power storage with respect to a fully-charged state in percentage) and outputs the estimate value to HV-ECU 70. Based on a torque capacity command and the like received from HV-ECU 70, ECT-ECU 68 generates a hydraulic pressure command for controlling transmission 30 and outputs the generated hydraulic pressure command to transmission 30. Based on an ABS execution command and the like received from HV-ECU 70, ABS-ECU 69 generates a command for controlling brake actuator 72 and outputs the generated command to brake actuator 72. ABS-ECU 69 also outputs, to HV-ECU 70, a signal indicating whether or not brake actuator 72 is usable.

HV-ECU 70 receives signals from shift lever 76 and various sensors, and generates various types of commands for controlling the devices in vehicle 10. As typical control executed by HV-ECU 70, HV-ECU 70 executes running control for controlling engine 12 and speed change unit 15 to a desired state and causing vehicle 10 to run, based on an amount of operation of an accelerator pedal, the vehicle speed and the like. In addition, HV-ECU 70 executes speed change control for controlling differential unit 20 and transmission 30 to a desired speed change state, based on a running state of the vehicle (an accelerator opening degree, the vehicle speed and the like), a position of shift lever 76 and the like. The details of this speed change control will be described below.

Shift lever 76 is a lever for causing the driver to select a prescribed shift range, and is arranged near the driver's seat. Shift lever 76 moves along a not-shown shift gate and can move to any one of a P position fix selecting a parking range (P range), an R position for selecting a reverse range (R range), an N position for selecting a neutral range (N range), and a D position for selecting a drive range (D range).

Each of drive wheel 44 and a driven wheel (not shown) is provided with a braking device 45. Braking device 45 is, for example, a disc brake, a drum brake and the like. Braking device 45 is actuated by a fluid pressure of a brake fluid supplied from a not-shown brake pipe in accordance with the operation of the brake pedal by the driver. Brake actuator 72 is provided at the brake pipe and adjusts the fluid pressure of the brake fluid supplied to braking device 45. ABS-ECU 69, brake actuator 72, and a wheel speed sensor (not shown) provided at each wheel form an ABS (Antilock Brake System). For example, when determining that the wheels are in a locked state based on a detection result of the wheel speed sensor, during running of vehicle 10 and during actuation of braking device 45 by the operation of the brake pedal, ABS-ECU 69 controls brake actuator 72 to reduce the fluid pressure of the brake fluid supplied to braking device 45 (pressure reduction operation). Subsequently, when determining that the wheels start to rotate and recover from the locked state, ABS-ECU 69 controls brake actuator 72 to increase the fluid pressure of the brake fluid supplied to braking device 45 from the reduced pressure state (pressure increase operation). Brake actuator 72 includes, for example, a solenoid valve and implements the pressure reduction operation and the pressure increase operation by the operation of the solenoid valve.

For example, when brake actuator 72 is in a normally actuated state, ABS-ECU 69 transmits, to HV-ECU 70, information indicating that the ABS is usable. On the other hand, when it is detected, by an abnormality diagnosis process executed as appropriate, that brake actuator 72 is in a not normally actuated state, ABS-ECU 69 transmits, to HV-ECU 70, information indicating that the ABS is unusable. The not normally actuated state of brake actuator 72 refers to, for example, a state in which a short circuit or a break occurs at an electrical circuit for driving brake actuator 72, and brake actuator 72 malfunctions.

In addition, ABS-ECU 69 controls brake actuator 72 to achieve a deceleration requested by the driver in conjunction with regenerative braking with a motor generator MG2, for example. The deceleration requested by the driver can be specified based on, for example, the accelerator opening degree and an amount of operation of the brake pedal.

Figure 2:
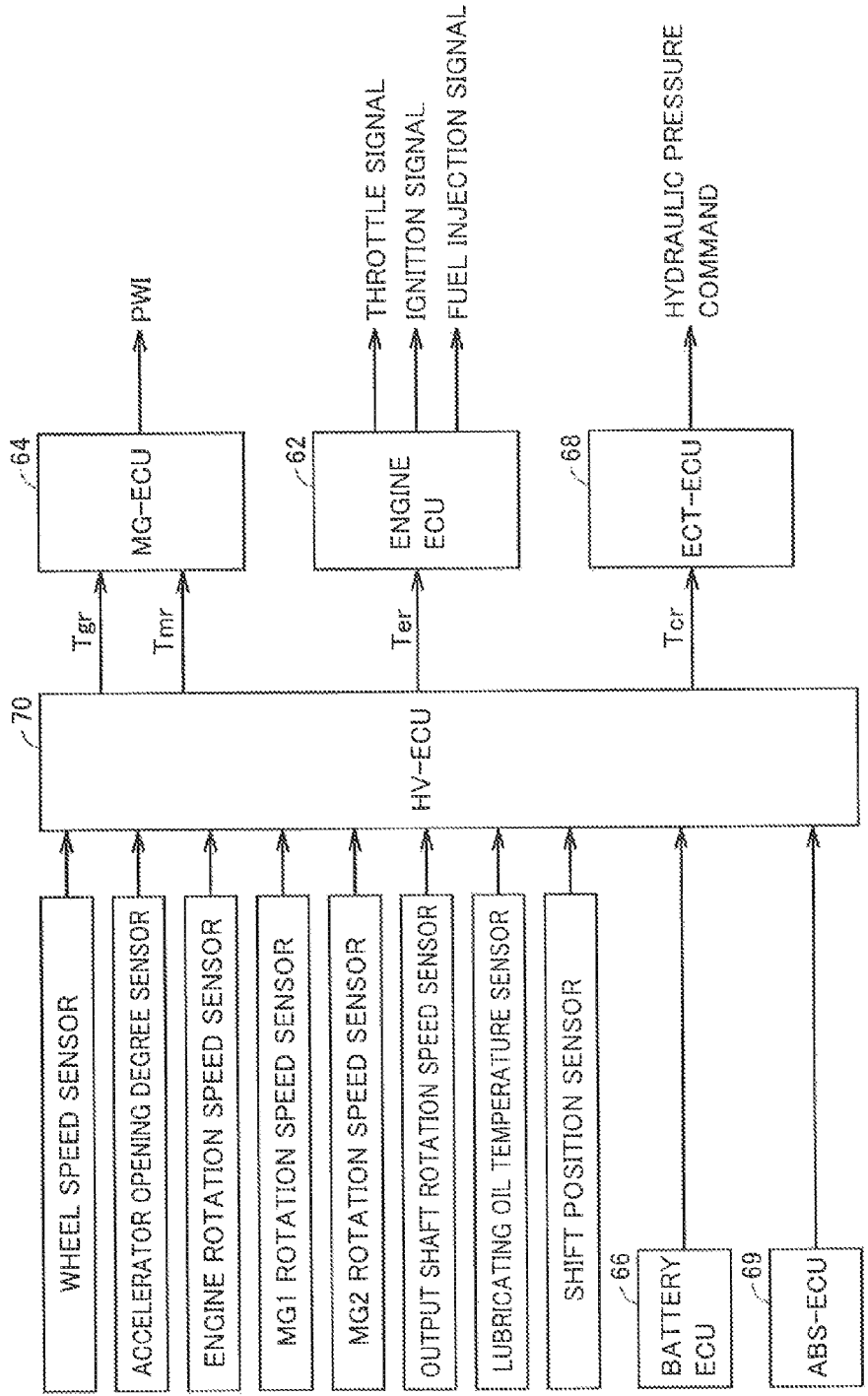
FIG. 2 is a diagram showing main signals and commands input and output to and from a control device.

FIG. 2 is a diagram showing main signals and commands input and output to and from control device 60 shown in FIG. 1. Referring to FIG. 2, HV-ECU 70 receives a signal from the wheel speed sensor, a signal from an accelerator opening degree sensor for detecting the amount of operation of the accelerator pedal, and a signal from an engine rotation speed sensor for detecting the rotation speed of engine 12. HV-ECU 70 further receives a signal from an MG1 rotation speed sensor for detecting the rotation speed of a motor generator MG1 (described below) included in differential unit 20, a signal from an MG2 rotation speed sensor for detecting the rotation speed of motor generator MG2 (described below) included in differential unit 20, and a signal from an output shaft rotation speed sensor for detecting the rotation speed of the output shaft of transmission 33.

Moreover, HV-ECU 70 further receives a signal from a lubricating oil temperature sensor for detecting the temperature of a lubricating oil in differential unit 20 and transmission 30, and a signal from a shift position sensor for detecting the position of shift lever 76. Furthermore, HV-ECU 70 receives, from battery ECU 66, a signal indicating the SOC value of power storage device 54. Furthermore, HV-ECU 70 receives, from ABS-ECU 69, a signal indicating whether or not brake actuator 72 is usable.

Then, based on the aforementioned signals, HV-ECU 70 generates an engine torque command Ter indicating a target value of the output torque of engine 12, and outputs engine torque command Ter to engine ECU 62. Based on the aforementioned signals, HV-ECU 70 also generates torque commands Tgr and Tmr for motor generators MG1 and MG2 in differential unit 20, and outputs torque commands Tgr and Tmr to MG-ECU 64. Furthermore, based on the signal from the shift position sensor, HV-ECU 70 determines a speed ratio (shift stage) of transmission 30, generates a torque capacity command Tcr for achieving this speed ratio, and outputs torque capacity command Tcr to ECT-ECU 68.

Engine ECU 62 that has received engine torque command Ter from HV-ECU 70 generates a throttle signal, an ignition signal, a fuel injection signal and the like for driving engine 12, and outputs these signals to engine 12. Based on torque commands Tgr and Tmr received from HV-ECU 70, MG-ECU 64 generates a signal PWI for driving motor generators MG1 and MG2 by inverter 52, and outputs signal PWI to inverter 52. ECT-ECU 68 generates a hydraulic pressure command such that transmission 30 has a torque capacity corresponding to torque capacity command Tcr, and outputs the hydraulic pressure command to transmission 30.

Figure 3:
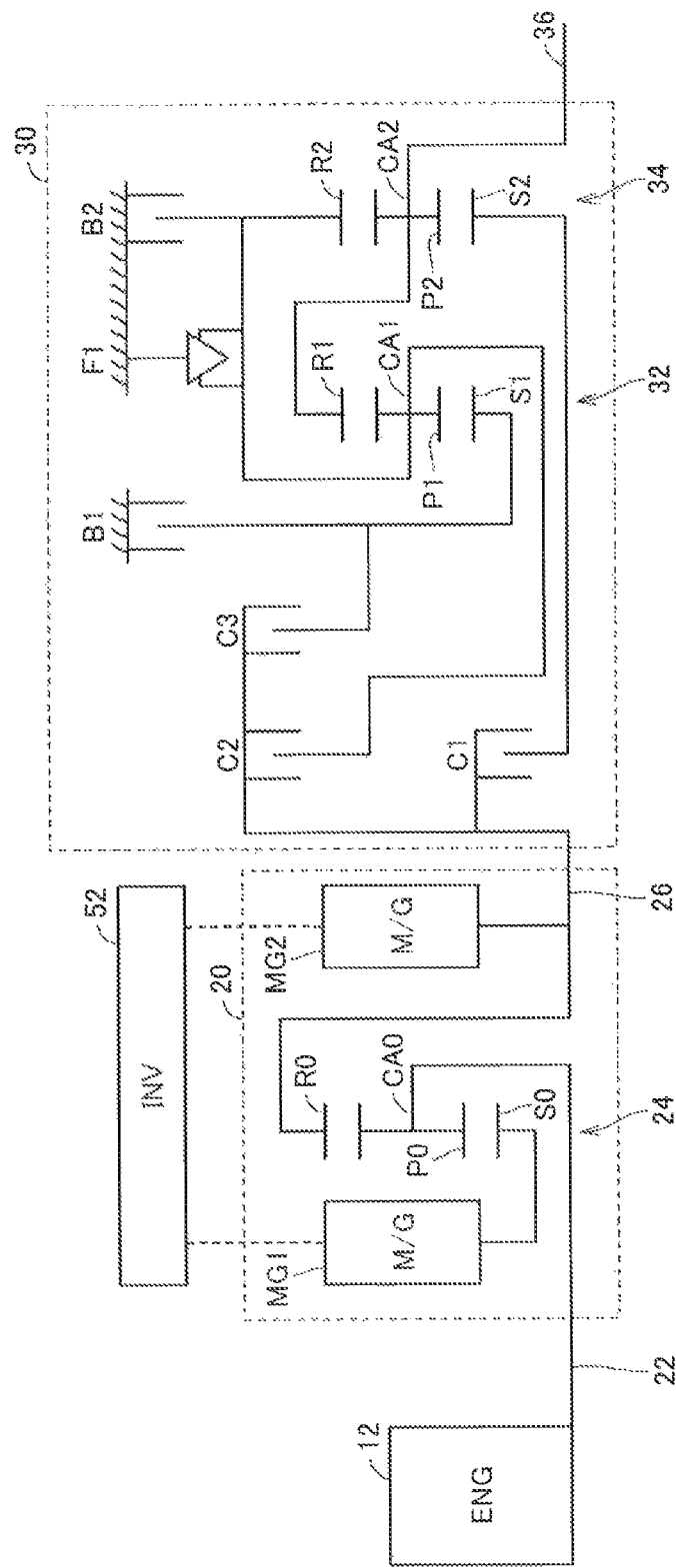
FIG. 3 is a diagram showing a configuration of a differential unit and a transmission.

FIG. 3 is a diagram showing a configuration of differential unit 20 and transmission 30 shown in FIG. 1. In the present embodiment, differential unit 20 and transmission 30 are configured to be symmetric with respect to a shaft center thereof, and thus, the lower part of differential unit 20 and transmission 30 is not shown in FIG. 3.

Referring to FIG. 3, differential unit 20 includes motor generators MG1 and MG2, and a power split device 24. Each of motor generators MG1 and MG2 is an AC motor and is configured by, for example, a permanent magnet-type synchronous motor including a rotor having a permanent magnet embedded therein. Motor generators MG1 and MG2 are driven by inverter 52.

Power split device 24 is configured by a single pinion-type planetary gear, and includes a sun gear S0, a pinion gear P0, a carrier CA0, and a ring gear R0. Carrier CA0 is coupled to an input shaft 22, i.e., the output shaft of engine 12, and supports pinion gear P0 so as to allow rotation and revolution. Sun gear S0 is coupled to a rotation shaft of motor generator MG1. Ring gear R0 is configured to be coupled to a transfer member 26 and engage with sun gear S0 through pinion gear P0. A rotation shall of motor generator MG2 is coupled to transfer member 26. Namely, ring gear R0 is also coupled to the rotation shaft of motor generator MG2.

Figures 4, 5:
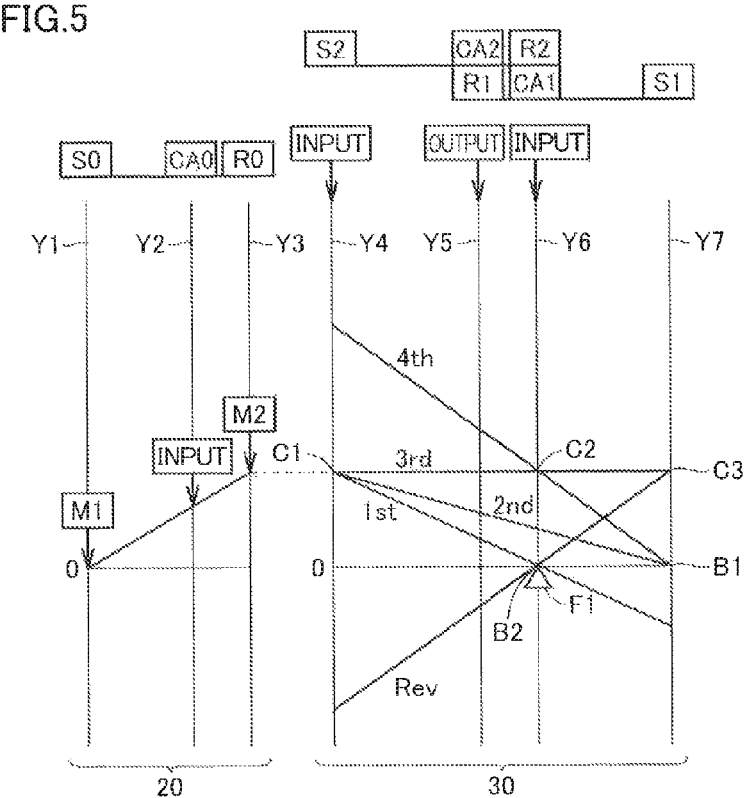
FIG. 4 is a diagram showing an engagement working table of the transmission.
FIG. 5 is a nomographic chart of a speed change unit configured by the differential unit and the transmission.

The relative rotation of sun gear S0, carrier CA0 and ring gear R0 causes power split device 24 to function as a differential device. The rotation speeds of sun gear S0, carrier CA0 and ring gear R0 have such a relationship that they are connected by a straight line in a nomographic chart as described below (FIG. 5). By the differential function of power split device 24, the motive power output from engine 12 is divided into sun gear S0 and ring gear R0. The motive power divided into sun gear S0 causes motor generator MG1 to operate as a generator, and the electric power generated by motor generator MG1 is supplied to motor generator MG2 or stored in power storage device 54 (FIG. 1). Motor generator MG1 generates the electric power by using the motive power divided by power split device 24 or motor generator MG2 is driven by using the electric power generated by motor generator MG1, and thereby, differential unit 20 can achieve the speed change function.

Transmission 30 includes single pinion-type planetary gears 32 and 34, clutches C1 to C3, brakes B1 and B2, and a one-way clutch F1. Planetary gear 32 includes a sun gear S1, a pinion gear P1, a carrier CA1, and a ring gear R1. Planetary gear 34 includes a sun gear S2, a pinion gear P2, a carrier CA2, and a ring gear R2.

Each of clutches C1 to C3 and brakes B1 and B2 is a hydraulically-actuated friction engagement device, and is configured by a wet multiplate-type device in which a plurality of stacked friction plates are hydraulically pressed, a band brake in which one end of a band wound around an outer circumferential surface of a rotating drum is hydraulically tightened, and the like. One-way clutch F1 supports carrier CA1 and ring gear R2 such that carrier CA1 and ring gear R2 coupled to each other can rotate in one direction and cannot rotate in the other direction.

In this transmission 30, the engagement devices of clutches C1 to C3, brakes B1 and B2, and one-way clutch F1 are engaged in accordance with an engagement working table shown in FIG. 4, and thereby, one of first to fourth shift stage gears and a reverse gear is formed. In FIG. 4, a circular mark indicates an engaged state, a circular mark within parentheses indicates engagement at the time of engine braking, a triangular mark indicates engagement only at the time of driving, and a blank indicates a disengaged state. In addition, by disengaging all engagement devices of clutches C1 to C3 and brakes B1 and B2, a neutral state (a state in which the motive power transfer is interrupted) can be formed.

Referring again to FIG. 3, differential unit 20 and transmission 30 are coupled by transfer member 26. An output shaft 36 coupled to carrier CA2 of planetary gear 34 is coupled to differential gear mechanism 42 (FIG. 1).

FIG. 5 is a nomographic chart of speed change unit 15 configured by differential unit 20 and transmission 30. Referring to FIG. 3 together with FIG. 5, a vertical line Y1 in the nomographic chart corresponding to differential unit 20 indicates the rotation speed of sun gear S0 of power split device 24, i.e., the rotation speed of motor generator MG1. A vertical line Y2 indicates the rotation speed of carrier CA0 of power split device 24, i.e., the rotation speed of engine 12. A vertical line Y3 indicates the rotation speed of ring gear R0 of power split device 24, i.e., the rotation speed of motor generator MG2. An interval between vertical lines Y1 to Y3 is determined in accordance with the gear ratio of power split device 24.

A vertical line Y4 in the nomographic chart corresponding to transmission 30 indicates the rotation speed of sun gear S2 of planetary gear 34, and a vertical line Y5 indicates the rotation speed of carrier CA2 of planetary gear 34 and ring gear R1 of planetary gear 32 coupled to each other. A vertical line Y6 indicates the rotation speed of ring gear R2 of planetary gear 34 and carrier CA1 of planetary gear 32 coupled to each other, and a vertical line Y7 indicates the rotation speed of sun gear S1 of planetary gear 32. An interval between vertical lines Y4 to Y7 is determined in accordance with the gear ratio of planetary gears 32 and 34.

When clutch C1 is engaged, sun gear S2 of planetary gear 34 is coupled to ring gear R0 of differential unit 20, and sun gear S2 rotates at the same speed as that of ring gear R0. When clutch C2 is engaged, carrier CA1 of planetary gear 32 and ring gear R2 of planetary gear 34 are coupled to ring gear R0, and carrier CA1 and ring gear R2 rotate at the same speed as that of ring gear R0. When clutch C3 is engaged, sun gear S1 of planetary gear 32 is coupled to ring gear R0, and sun gear S1 rotates at the same speed as that of ring gear R0. When brake B1 is engaged, the rotation of sun gear S1 stops. When brake B2 is engaged, the rotation of carrier CA1 and ring gear R2 stops.

For example, as shown in the engagement working table in FIG. 4, when clutch C1 and brake B1 are engaged and the other clutches and brake are disengaged, the nomographic chart of transmission 30 shows a straight line indicated by "2nd". Vertical line Y5 indicating the rotation speed of carrier CA2 of planetary gear 34 indicates the output rotation speed of transmission 30 (rotation speed of output shaft 36). As described above, by engaging or disengaging clutches C1 to C3 and brakes B1 and B2 in transmission 30 in accordance with the engagement working table in FIG. 4, the first to fourth shift stage gears, the reverse gear and the neutral state can be formed.

On the other hand, in differential unit 20, motor generators MG1 and MG2 are rotationally controlled as appropriate, and thereby, the stepless speed change capable of continuously changing the rotation speed of ring gear R0, i.e., the rotation speed of transfer member 26 with respect to the rotation speed of engine 12 coupled to carrier CA0 is achieved. By coupling transmission 30 capable of changing a speed ratio between transfer member 26 and output shaft 36 to this differential unit 20, it is possible to reduce the speed ratio of differential unit 20 while having the stepless speed change function by differential unit 20, and it is possible to reduce the loss of motor generators MG1 and MG2.

In this vehicle 10, when the D range is selected by shift lever 76, the automatic speed change is executed based on the running state (automatic speed change mode). The running state refers to, for example, the accelerator opening degree and the vehicle speed. However, the running state may refer to the requested driving force, the output torque and the like instead of the accelerator opening degree, or may refer to the rotation speed of the drive shaft and the like instead of the vehicle speed. For example, in accordance with a shift map in which the speed ratio (shift stage) is determined based on the accelerator opening degree and the vehicle speed, the speed ratio of transmission 30 is set based on the accelerator opening degree and the vehicle speed. Engine 12 as well as motor generators MG1 and MG2 of differential unit 20 are controlled such that the desired rotation speed and torque are input to transmission 30 in consideration of the speed ratio of transmission 30.

When vehicle 10 runs by using only the motive power of MG2, with engine 12 stopped (when the EV running is executed), a shift map different from a shift map when vehicle 10 runs with engine 12 actuated may be used.

Figure 6:
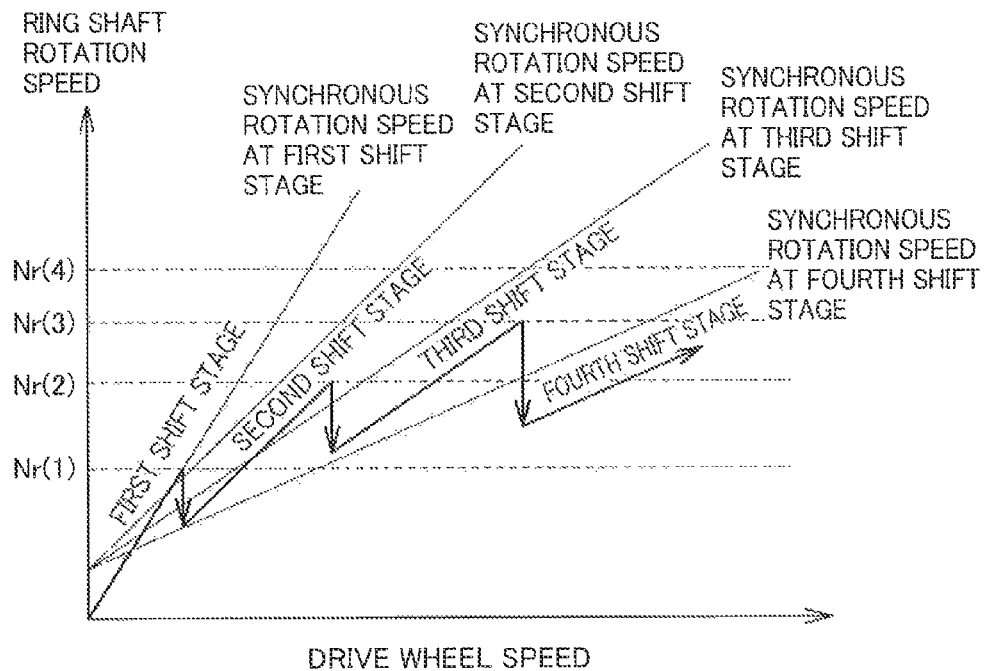
FIG. 6 is a diagram for describing the speed change operation during EV running.

For example, when the accelerator opening degree is fixed, transmission 30 may be controlled such that, during execution of the EV running, the rotation speed of ring gear R0 does not exceed an engine startup threshold value set for each shift stage in order to prevent the reverse rotation of engine 12 in the stop state, as shown in FIG. 6.

The horizontal axis in FIG. 6 indicates the rotation speed of the drive wheel, and the vertical axis in FIG. 6 indicates the rotation speed of ring gear R0. For example, in the case where vehicle 10 starts moving at the first shift stage, ECT-ECU 68 controls transmission 30 such that the shift stage is changed from the first shift stage to the second shift stage when the rotation speed of ring gear R0 reaches a threshold value Nr(1), and thereby, the rotation speed of ring gear R0 is reduced. Threshold value Nr(1) may be a predetermined value, or may be a value that changes in accordance with the accelerator opening degree, the requested driving force, the output torque and the like.

In the case where vehicle 10 is running at the second shift stage, ECT-ECU 68 controls transmission 30 such that the shift stage is changed from the second shift stage to the third shift stage when the rotation speed of ring gear R0 reaches a threshold value Nr(2), and thereby, the rotation speed of ring gear R0 is reduced. Threshold value Nr(2) may be a predetermined value, or may be a value that changes in accordance with the accelerator opening degree, the requested driving force, the output torque and the like.

In the case where vehicle 10 is running at the third shift stage, ECT-ECU 68 controls transmission 30 such that the shift stage is changed from the third shift stage to the fourth shift stage when the rotation speed of ring gear R0 reaches a threshold value Nr(3), and thereby, the rotation speed of ring gear RD is reduced. Threshold value Nr(3) may be a predetermined value, or may be a value that changes in accordance with the accelerator opening degree, the requested driving force, the output torque and the like.

Transmission 30 is controlled such that the rotation speed of ring gear RD does not exceed the threshold value as shown in FIG. 6, and thus, the stop state of engine 12 is maintained and the reverse rotation of engine 12 is prevented.

In such vehicle 10, when a slip occurs at the drive wheel during the motor running, braking device 45 may be actuated to reduce the rotation speed of drive wheel 44 in order to immediately suppress the slip.

However, when braking device 45 is actuated to reduce the rotation speed of drive wheel 44, the rotation shaft of the engine that rotates in a predetermined direction in differential unit 20 described above at the time of normal actuation may sometimes rotate in the direction opposite to the predetermined direction.

Figure 7:
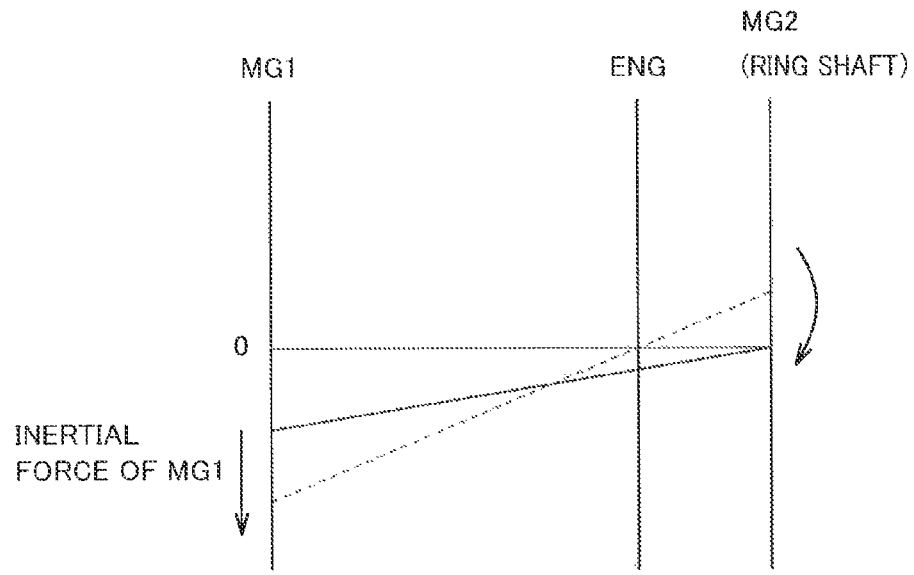
FIG. 7 is a nomographic chart showing a behavior of the vehicle when braking is performed using a brake at the time of occurrence of a slip.

FIG. 7 illustrates a nomographic chart of differential unit 20 showing the operation when braking device 45 is actuated using brake actuator 72 and thereby drive wheel 44 of vehicle 10 recovers from the slip state to the grip state during execution of the EV running.

For example, as shown by a broken line in FIG. 7, when engine 12 is in the stop state (the rotation speed of engine 12 is zero) and drive wheel 44 is in the slip state, ring gear R0 is in a state where ring gear RD rotates at a certain rotation speed.

At this time, HV-ECU 70 actuates braking device 45 by using brake actuator 72, in order to eliminate the slip state. In this case, in the nomographic chart of FIG. 7, a straight line shown by the broken line in FIG. 7 changes into a straight line shown by a solid line in FIG. 7. Namely, the rotation of drive wheel 44 is suppressed and the rotation speed of ring gear R0 is reduced, and further, a state of the inertial force of MG1 being acting is maintained, and thus, the force of rotation in the direction opposite to the direction at the time of actuation may act on engine 12 and engine 12 may rotate reversely. In addition to when braking device 45 is actuated during the slip state, when a road surface changes from a low µ road to a high µ road, drive wheel 44 changes from the slip state to the grip state and the rotation of drive wheel 44 is suppressed, and thus, engine 12 may rotate reversely as described above.

Thus, the present embodiment is characterized in that when vehicle 10 is running by using motor generator MG2, with engine 12 stopped, and a magnitude of an amount of change in rotation speed of ring gear R0 is larger than a threshold value, HV-ECU 70 executes at least one of control for actuating engine 12 and control for bringing transmission 30 into a motive power interruption state.

With this, the rotation of the rotation shaft of engine 12 in the direction opposite to the direction at the time of actuation can be suppressed.

Figure 8:
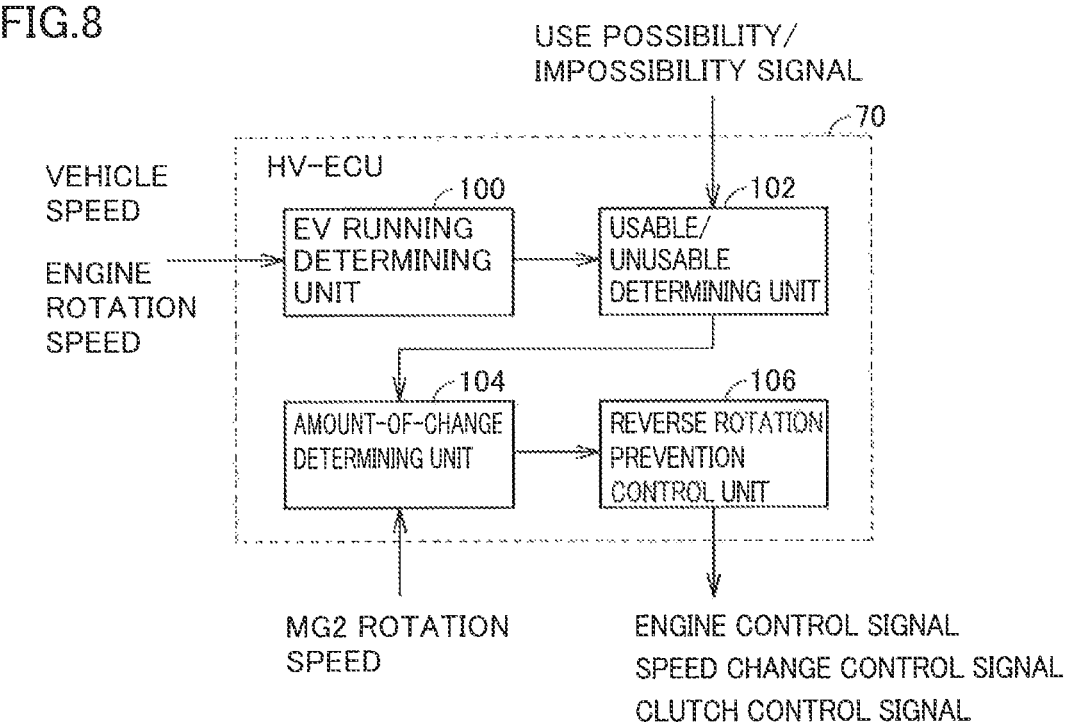
FIG. 8 is a functional block diagram of an HV-ECU.

FIG. 8 shows a functional block diagram of HV-ECU 70 mounted on vehicle 10 according to the present embodiment. HV-ECU 70 includes an EV running determining unit 100, a usable/unusable determining unit 102, an amount-of-change determining unit 104, and a reverse rotation prevention control unit 106. These configurations may be implemented by software such as a program, or may be implemented by hardware.

EV running determining unit 100 determines whether or not the EV running is in execution in vehicle 10. When the speed of vehicle 10 is higher than a threshold value (e.g., zero) and the rotation speed of engine 12 is equal to or lower than a threshold value (e.g., zero) for determining the stop state, EV running determining unit 100 may determine that the EV running is in execution in vehicle 10. Alternatively, based on a state of a flag turned on when the EV running is executed, EV running determining unit 100 may determine whether or not the EV running is in execution in vehicle 10.

Based on the information indicating whether or not brake actuator 72 is usable, which is received from ABS-ECU 69, usable/unusable determining unit 102 determines whether or not the ABS is usable. For example, when EV running determining unit 100 determines that the EV running is in execution in vehicle 10, usable/unusable determining unit 102 determines whether or not the ABS is usable.

Amount-of-change determining unit 104 determines whether or not a magnitude of an amount of reduction in rotation speed of ring gear R0 is larger than a threshold value. For example, amount-of-change determining unit 104 assumes the rotation speed of MG2 as the rotation speed of ring gear R0 and calculates the amount of reduction per prescribed time (e.g., per unit time). Amount-of-change determining unit 104 determines whether or not the magnitude of the calculated amount of reduction is larger than the threshold value.

For example, amount-of-change determining unit 104 sets different threshold values between when usable/unusable determining unit 102 determines that the ABS is usable and when usable/unusable determining unit 102 determines that the ABS is unusable. For example, assuming that the shift stage is the same, a threshold value A when the ABS is usable is set to be larger than a threshold value B when the ABS is unusable. This is because, when the ABS is unusable, the amount of change in rotation speed of ring gear R0 is large, and determination as to whether to execute reverse rotation prevention control for engine 12 needs to be made quickly, and thus, threshold value B is set to be smaller than threshold value A.

In addition, amount-of-change determining unit 104 changes the threshold value in accordance with the shift stage formed in transmission 30. For example, amount-of-change determining unit 104 sets the threshold value such that the threshold value becomes larger as the shift stage becomes a high speed side shift stage (e.g., as the shift stage becomes the third shift stage or the fourth shift stage), and the threshold value becomes smaller as the shift stage becomes a low speed side shift stage (e.g., as the shift stage becomes the first shift stage or the second shift stage). This is because the amount of change in rotation speed of ring gear R0 becomes larger as the shift stage becomes the low speed side shift stage, and determination as to whether to execute the reverse rotation prevention control for engine 12 needs to be made quickly, and thus, the threshold value is set to be smaller than the threshold value corresponding to the high speed side shift stage.

When amount-of-change determining unit 104 determines that the magnitude of the amount of reduction in rotation speed of ring gear R0 is larger than the threshold value, reverse rotation prevention control unit 106 executes the reverse rotation prevention control. The reverse rotation prevention control refers to control of the devices provided on a motive power transfer path between engine 12 and drive wheel 44 so as to suppress the rotation of the rotation shaft of engine 12 in the direction opposite to the rotation direction at the time of actuation. In the present embodiment, the reverse rotation prevention control includes startup control for starting engine 12, clutch disengagement control for disengaging clutch C1 which is a start clutch of transmission 30, and speed change control for changing the shift stage formed in transmission 30.

Reverse rotation prevention control unit 106 selects at least one of the startup control, the clutch disengagement control and the speed change control, and executes the selected control. Conditions for selection will be described below.

When executing the startup control, reverse rotation prevention control unit 106 rotates the rotation shaft of engine 12 by using MG1, and controls engine 12 such that ignition control and fuel injection control are executed on or after the timing at which the rotation speed of engine 12 exceeds the rotation speed at which first explosion can take place.

When executing the clutch disengagement control, reverse rotation prevention control unit 106 disengages clutch C1 of transmission 30 and controls transmission 30 such that transmission 30 enters the neutral state.

When executing the speed change control, reverse rotation prevention control unit 106 controls transmission 30 to change the shift stage formed in transmission 30 into a shift stage (e.g., a shift stage that is on the high speed side by one shift stage) different from the current shift stage.

Based on a state of vehicle 10 when amount-of-change determining unit 104 determines that the amount of reduction in rotation speed of ring gear R0 is larger than the threshold value, reverse rotation prevention control unit 106 selects at least one of the startup control, the clutch disengagement control and the speed change control.

For example, when the driver selects a running mode in which emphasis is placed on enhancement of fuel efficiency, reverse rotation prevention control unit 106 does not select the startup control for starting engine 12 and executes either the clutch disengagement control or the speed change control. Selection of the running mode is made by, for example, a switch and the like provided at the driver's seat.

For example, when it can be determined that the magnitude of the amount of reduction in rotation speed of ring gear R0 becomes smaller than the threshold value by changing the shift stage to the high speed side shift stage, reverse rotation prevention control unit 106 may select the speed change control. Alternatively, when the shift stage is already the high speed side shift stage or when the magnitude of the amount of reduction in rotation speed of ring gear R0 is maintained to be larger than the threshold value even if the shift stage is changed to the high speed side shift stage, reverse rotation prevention control unit 106 may select the clutch disengagement control, or may execute the clutch disengagement control after executing the speed change control.

For example, when a running mode requesting the high driving force (e.g., a sports running mode) is selected as the running mode of vehicle 10, reverse rotation prevention control unit 106 selects the startup control for starting engine 12. With this, the motive power of engine 12 can be used during acceleration of vehicle 10, and thus, the acceleration responsiveness can be enhanced.

Reverse rotation prevention control unit 106 may select the speed change control together with the startup control. For example, reverse rotation prevention control unit 106 may start engine 12, and in addition, may control transmission 30 such that the shift stage is changed to the high speed side shift stage. With this, the rotation of engine 12 in the direction opposite to the direction at the time of actuation can be prevented reliably.

For example, even when the running mode requesting the high driving force is not selected, reverse rotation prevention control unit 106 may select the startup control in the case where it is determined that the driver is requesting the higher driving force for vehicle 10, based on at least any one of a history of a detection result of a G sensor (not shown), a history of the operation of the accelerator pedal (a history of a change in accelerator opening degree), and a history of the operation of the brake pedal.

For example, when a magnitude of an acceleration (or a deceleration) of vehicle 10 during acceleration and during deceleration is larger than a threshold value based on the history of the detection result of the G sensor, reverse rotation prevention control unit 106 may determine that the driver is driving vehicle 10 in the sports running mode (i.e., the driver is requesting the higher driving force during running of vehicle 10), and select the startup control.

Alternatively, when a total of a duration of the accelerator opening degree being larger than a threshold value is larger than a threshold value or when a magnitude of the most recent amount of change in accelerator opening degree is larger than a threshold value, based on the history of the change in accelerator opening degree, reverse rotation prevention control unit 106 may determine that the driver is driving vehicle 10 in the sports running mode, and select the startup control.

Alternatively, when a magnitude of the most recent amount of change in amount of operation of the brake pedal is larger than a threshold value based on the history of the operation of the brake pedal, reverse rotation prevention control unit 106 may determine that the driver is driving vehicle 10 in the sports running mode, and select the startup control.

Figure 9:
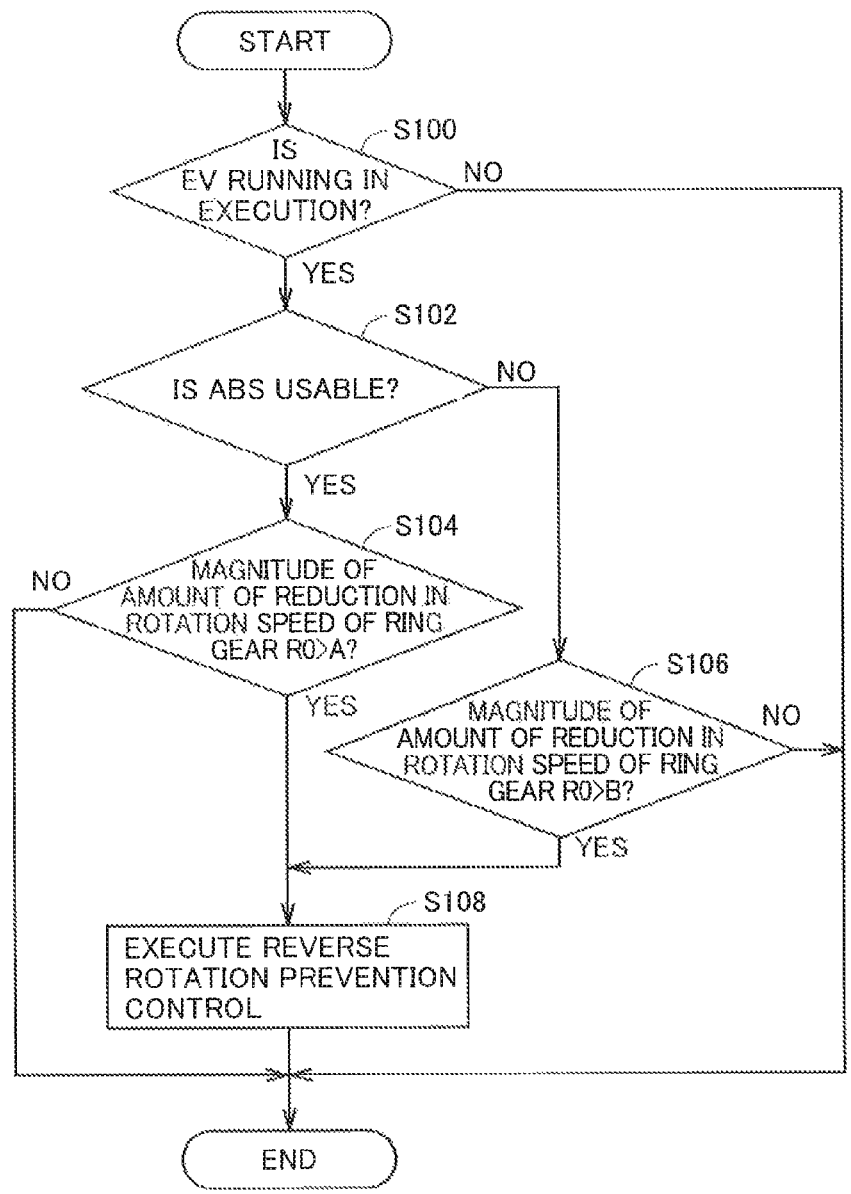
FIG. 9 is a flowchart showing a control process executed by the HV-ECU.

A control process executed by HV-ECU 70 mounted on vehicle 10 according to the present embodiment will be described with reference to FIG. 9.

In step (hereinafter, "step" will be denoted as "S") 100, HV-ECU 70 determines whether or not the EV running is in execution. If it is determined that the EV running is in execution (YES in S100), the process proceeds to S102. If not (NO in S100), this process ends.

In S102, HV-ECU 70 determines whether or not the ABS is usable. If the ABS is usable (YES in S102), the process proceeds to S104. If not (NO in S102), the process proceeds to S106.

In S104, HV-ECU 70 determines whether or not the magnitude of the amount of reduction in rotation speed of ring gear R0 is larger than threshold value A. If it is determined that the magnitude of the amount of reduction in rotation speed of ring gear RU is larger than threshold value A (YES in S104), the process proceeds to S108. If not (NO in S104), this process ends.

In S106, HV-ECU 70 determines whether or not the magnitude of the amount of reduction in rotation speed of ring gear R0 is larger than threshold value B threshold value A). If it is determined that the magnitude of the amount of reduction in rotation speed of ring gear R0 is larger than threshold value B (YES in S106), the process proceeds to S108. If not (NO in S106), this process ends.

In S108, HV-ECU 70 executes the reverse rotation prevention control. Since the details of the reverse rotation prevention control have been described above, detailed description thereof will not be repeated.

The operation of HV-ECU 70 mounted on vehicle 10 according to the present embodiment based on the aforementioned structure and flowchart will be described with reference to FIG. 10.

Figure 10:
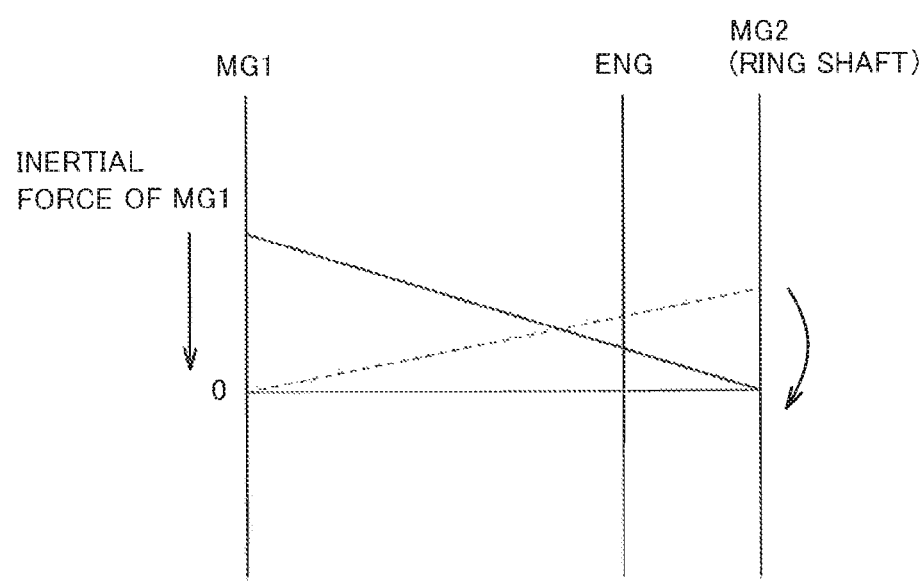
FIG. 10 is a nomographic chart for describing the operation of the HV-ECU.

FIG. 10 illustrates a nomographic chart of differential unit 20 showing the operation for preventing the reverse rotation of engine 12 by starting engine 12 during execution of the EV running.

For example, when engine 12 is in the stop state and drive wheel 44 is in the slip state during the EV running (YES in S100), ring gear R0 is in the state where ring gear R0 rotates at a certain rotation speed.

For example, when HV-ECU 70 actuates braking device 45 by using brake actuator 72, the rotation of drive wheel 44 is suppressed, and thereby, the rotation speed of ring gear R0 is reduced.

At this time, when the ABS is usable (YES in S102) and when the magnitude of the amount of reduction in rotation speed of ring gear R0 is larger than threshold value A (YES in S104), the reverse rotation prevention control is executed (S108). When the ABS is unusable (NO in S102), the reverse rotation prevention control is executed (S108) when the magnitude of the amount of reduction in rotation speed of ring gear R0 is larger than threshold value B (YES in S106).

For example, when vehicle 10 is running in the sports running mode, the startup control for engine 12 is executed as the reverse rotation prevention control. When the startup control for engine 12 is executed, the rotation speed of engine 12 is increased (cranked) by MG1, and thereafter, the ignition control and the fuel injection control are executed. As a result, as shown by a broken line in FIG. 10, engine 12 enters an actuated state. Therefore, as shown by a solid line in FIG. 10, drive wheel 44 changes from the slip state to the grip state, and engine 12 is actuated even if the rotation speed of ring gear R0 is reduced. Thus, the rotation of the rotation shaft of engine 12 in the direction opposite to the direction at the time of actuation is suppressed.

For example, when the running mode of vehicle 10 in which emphasis is placed on enhancement of fuel efficiency is selected, at least one of the clutch disengagement control and the speed change control is executed as the reverse rotation prevention control. When the clutch disengagement control is executed, clutch C1 is disengaged, and thus, transmission 30 enters the neutral state. As a result, ring gear R0 is not pulled down, and thus, the force of rotation in the direction opposite to the direction at the time of actuation does not act on the rotation shaft of engine 12. Therefore, the reverse rotation of the rotation shaft of engine 12 is suppressed.

On the other hand, when the speed change control is executed, the shift stage is changed to the higher speed side shift stage than the current shift stage. As a result, an amount of pull-down of ring gear R0 decreases, and thus, the force acting on the rotation shaft of engine 12 in the direction opposite to the direction at the time of actuation is reduced. Therefore, the reverse rotation of the rotation shaft of engine 12 is suppressed.

As described above, according to the vehicle in accordance with the present embodiment, by actuating engine 12, or by using clutch C1 to bring a state between drive wheel 44 and engine 12 into the motive power interruption state, or by changing the shift stage of transmission 30 to the high speed side shill stage, it is possible to suppress the reverse rotation of the rotation shall of engine 12 when braking device 45 is actuated due to the occurrence of the slip during the motor running, regardless of whether or not the driver operates the brake pedal. Therefore, the durability of engine 12 can be increased. Accordingly, it is possible to provide the vehicle that suppresses the rotation of the rotation shaft of the internal combustion engine in the direction opposite to the direction at the time of actuation during the motor running.

Furthermore, since the different values are set as the threshold value in accordance with whether or not the ABS is usable, an appropriate threshold value can be set in accordance with whether or not the ABS is usable. Therefore, unnecessary startup of engine 12 can be suppressed.

In addition, the threshold value may be set in accordance with the speed ratio of transmission 30. With this, an appropriate threshold value can be set in accordance with the speed ratio. Therefore, unnecessary startup of engine 12 can be suppressed.

Modifications will be described below.

In the present embodiment, the startup control has been described as the control including the ignition control and the fuel injection control. However, in the startup control, at least engine 12 may only be actuated and the startup control is not limited to the control including the ignition control and the fuel injection control. The startup control may be, for example, motoring using motor generator MG1.

In the present embodiment, a hybrid vehicle having two motor generators MG1 and MG2 coupled to sun gear S0 and ring gear R0 of the planetary gear mechanism, respectively, has been described as one example of vehicle 10. However, vehicle 10 may be a hybrid vehicle having a configuration in which the rotation shaft of engine 12 is coupled at least to carrier CA0 of the planetary gear mechanism and the motor generator is coupled to one of sun gear S0 and ring gear R0 of the planetary gear mechanism.

In the present embodiment, description has been given by way of example about the configuration in which transmission 30 is coupled between the drive wheel and ring gear R0 of the planetary gear mechanism which is differential unit 20. However, the present invention is not particularly limited to such a configuration. For example, the present invention may be configured such that transmission 30 is omitted, or may be configured such that a speed change mechanism including a planetary gear mechanism different from differential unit 20 is provided between carrier CA0 and engine 12, or may be configured such that a speed change mechanism including a planetary gear mechanism different from differential unit 20 is provided between sun gear S0 and motor generator MG1.

In the present embodiment, description has been given about the case of executing the reverse rotation prevention control for engine 12 when the magnitude of the amount of reduction in rotation speed of ring gear R0 is larger than the threshold value during execution of the EV running. However, in the case where vehicle 10 is running on the low μ road, for example, the reverse rotation prevention control for engine 12 may be executed when the rotation speed of ring gear R0 becomes larger than the threshold value. Determination as to whether or not vehicle 10 is running on the low μ road may be made based on, for example, the position information from a navigation system, or based on whether or not a difference between the wheel speed and the vehicle speed is larger than a threshold value.

In the present embodiment, description has been given about the case of executing the reverse rotation prevention control for engine 12 when the magnitude of the amount of reduction in rotation speed of ring gear R0 is larger than the threshold value (i.e., when a change from the slip state to the grip state is detected) during execution of the EV running. However, the reverse rotation prevention control for engine 12 may be executed when the slip state of drive wheel 44 is detected, for example. Alternatively, the reverse rotation prevention control for engine 12 may be executed when a magnitude of an amount of increase in rotation speed of ring gear R0 is larger than a threshold value (i.e., when a change from the grip state to the slip state is detected). Alternatively, the reverse rotation prevention control for engine 12 may be executed when the magnitude of the amount of change in rotation speed of ring gear R0 is larger than the threshold value (i.e., when a change between the grip state and the slip state is detected).

In the present embodiment, description has been given about the case of determining whether to execute the reverse rotation prevention control for engine 12, based on the rotation speed of ring gear R0. However, whether to execute the reverse rotation prevention control for engine 12 may be determined based on, for example, the rotation speed of any one of the plurality of rotation elements provided on the motive power transfer path between ring gear R0 and drive wheel 44.

In the present embodiment, description has been given about the case of executing the speed change control together with the startup control. However, only the speed change control may be executed, for example. The aforementioned modifications may be implemented by combining all or a part of the modifications.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A vehicle comprising:
   a planetary gear mechanism having a sun gear, a ring gear and a carrier;
   an internal combustion engine coupled to said carrier and configured to rotate in a predetermined direction at the time of actuation;
   a drive wheel coupled to one rotation element which is one of said sun gear and said ring gear;
   a rotating electric machine provided on a motive power transfer path between said one rotation element and said drive wheel;
   a clutch for switching a state between said internal combustion engine and said drive wheel from one of a motive power transfer state and a motive power interruption state to the other; and
   a controller, wherein when said vehicle is running by using said rotating electric machine, with said internal combustion engine stopped, and a reduction of rotation speed per prescribed time of said one rotation element is above a threshold value, the controller is configured to
   (i) when a first running mode is selected, control said vehicle to actuate said internal combustion engine, and
   (ii) when a second running mode is selected, control said clutch to bring about said motive power interruption state,
   wherein
   said first running mode is selected by the controller when a user requests driving force higher than driving force in said second running mode, and
   said second running mode is selected by the controller when a user requests enhanced fuel efficiency relative to said first running mode.

2. The vehicle according to claim 1, wherein said threshold value is set to be larger when braking with an antilock brake system is possible than when braking with said antilock brake system is impossible.

3. The vehicle according to claim 1, further comprising a transmission provided between said one rotation element and said drive wheel, and configured to change a speed ratio, wherein
said threshold value is set to be larger when the speed ratio is a high speed side speed ratio than when the speed ratio is a low speed side speed ratio.

* * * * *